US012686207B2

(12) United States Patent
Arai et al.

(10) Patent No.: US 12,686,207 B2
(45) Date of Patent: Jul. 21, 2026

(54) LIQUID DROPLET FORMING DEVICE

(71) Applicants: Daisuke Arai, Tokyo (JP); Takahiko Matsumoto, Kanagawa (JP); Yusuke Nonoyama, Kanagawa (JP)

(72) Inventors: Daisuke Arai, Tokyo (JP); Takahiko Matsumoto, Kanagawa (JP); Yusuke Nonoyama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 161 days.

(21) Appl. No.: 18/383,272

(22) Filed: Oct. 24, 2023

(65) Prior Publication Data

US 2024/0131839 A1 Apr. 25, 2024
US 2024/0227388 A9 Jul. 11, 2024

(30) Foreign Application Priority Data

Oct. 25, 2022 (JP) ................................ 2022-170575

(51) Int. Cl.
*B41J 2/14* (2006.01)
*B41J 2/045* (2006.01)

(52) U.S. Cl.
CPC ......... *B41J 2/14201* (2013.01); *B41J 2/0451* (2013.01); *B41J 2/04561* (2013.01);
(Continued)

(58) Field of Classification Search
CPC .. B41J 2/14201; B41J 2/0451; B41J 2/04561; B41J 2/04581; B41J 2/04596; B41J 2202/15
See application file for complete search history.

(56) References Cited

U.S. PATENT DOCUMENTS 9,517,622 B2 * 12/2016 Kuramochi .......... B41J 2/04596
2016/0176191 A1 6/2016 Kuramochi et al.
(Continued)

FOREIGN PATENT DOCUMENTS

JP 5105470 B2 12/2012
JP 6589547 B2 10/2019
(Continued)

OTHER PUBLICATIONS

Office Action issued May 26, 2026 in Japanese Application No. 2022-170575.

*Primary Examiner* — Geoffrey S Mruk
(74) *Attorney, Agent, or Firm* — XSENSUS LLP

(57) ABSTRACT

A liquid droplet forming device for stably forming and ejecting a liquid droplet of a dispersion liquid containing settling particles includes an ejection head that ejects a liquid droplet of a liquid containing settling particles, and a control unit. The control unit controls a behavior of the ejection head by supplying an electrical signal. The ejection head includes a liquid holding portion that holds the liquid, a film-like member that has an ejection hole for ejecting the liquid droplet and that forms a liquid chamber, which holds the liquid, together with the liquid holding portion, and vibration applying means for vibrating the film-like member based on the electrical signal. The electrical signal includes an ejection signal for forming the liquid droplet by vibrating the film-like member, a stirring signal for vibrating the film-like member and a micro-vibration signal.

19 Claims, 6 Drawing Sheets

(52) U.S. Cl.
CPC ....... *B41J 2/04581* (2013.01); *B41J 2/04596* (2013.01); *B41J 2202/15* (2013.01)

(56) References Cited

U.S. PATENT DOCUMENTS

| | | | | |
|---|---|---|---|---|
| 2017/0120604 | A1 | 5/2017 | Seo et al. | |
| 2018/0340880 | A1* | 11/2018 | Matsumoto ........ | G01N 15/1459 |
| 2019/0232661 | A1 | 8/2019 | Akai et al. | |

FOREIGN PATENT DOCUMENTS

| | | | |
|---|---|---|---|
| JP | 6627394 | B2 | 1/2020 |
| JP | 2020-199730 | A | 12/2020 |
| JP | 6840988 | B2 | 3/2021 |
| JP | 2021-145630 | A | 9/2021 |
| JP | 7069881 | B2 | 5/2022 |

* cited by examiner

LIQUID DROPLET FORMING DEVICE

TECHNICAL FIELD

The present invention relates to a liquid droplet forming device.

Priority is claimed on Japanese Patent Application No. 2022-170575, filed on Oct. 25, 2022, the content of which is incorporated herein by reference.

BACKGROUND ART

Conventionally, an ink jet type liquid droplet forming device is known as a technique for ejecting a liquid substance (liquid) such as ink to a desired position.

In recent years, there has been a demand in the liquid droplet forming device to eject various liquids in place of ink used in conventional two-dimensional printing. Exemplary examples of the liquid to be ejected include a dispersion liquid as well as a solution. Exemplary examples of dispersoids (particles) contained in the dispersion liquid include organic materials such as a resin material, inorganic materials such as metal particles and oxide particles, and biologically derived materials such as cells and genes.

In a case where the above-described dispersion liquid is ejected in a liquid droplet ejecting device, the dispersoids may settle in a liquid chamber. In the following description, the dispersoids that settle in the dispersion liquid may be referred to as “settling particles”. In a case where settling particles settle, the concentration of settling particles contained in the liquid to be ejected changes even in a case where the amount of liquid droplets to be ejected is constant, which makes it difficult to stably eject a desired amount of dispersoids.

In response to such a conventional problem, a technique for stirring a dispersion liquid containing settling particles by appropriately applying vibration and inducing convection has been proposed in a liquid droplet forming device that stores the dispersion liquid (for example, see Patent Document 1). In Patent Document 1, vibration is applied to a film-like member, which is used when forming liquid droplets in the liquid droplet forming device, in a range in which liquid droplets are not formed, thereby stirring the liquid.

SUMMARY OF INVENTION

Technical Problem

In the configuration described in Patent Document 1, there are cases where insufficient stirring may occur, and not only liquid stirring but also unintended ejection of liquid droplets may occur, even when the same vibration is applied to the film-like member, due to the differences in individual devices and the amount of liquid stored. Therefore, it has been difficult to stably form liquid droplets of constant quality, and improvement has been required.

The present invention has been made in view of such circumstances, and an object of the present invention is to provide a liquid droplet forming device capable of stably forming and ejecting a liquid droplet of a dispersion liquid containing settling particles.

Solution to Problem

In order to achieve the above object, according to an aspect of the present invention, there is provided a liquid droplet forming device including: an ejection head that ejects a liquid droplet of a liquid containing settling particles; and a control unit that controls a behavior of the ejection head by supplying an electrical signal, in which the ejection head includes a liquid holding portion that holds the liquid, a film-like member that has an ejection hole for ejecting the liquid droplet and that forms a liquid chamber, which holds the liquid, together with the liquid holding portion, and vibration applying means for vibrating the film-like member based on the electrical signal, the electrical signal includes an ejection signal for forming the liquid droplet by vibrating the film-like member, a stirring signal for vibrating the film-like member in a range in which the liquid droplet is not formed, the stirring signal having a drive voltage of a signal waveform lower than a drive voltage of the ejection signal, and a micro-vibration signal having a drive voltage lower than the drive voltage of the stirring signal, and the control unit selectively supplies any one of the ejection signal, the stirring signal, and the micro-vibration signal to the vibration applying means.

Advantageous Effects of Invention

In the present invention, it is possible to provide a liquid droplet forming device capable of stably forming and ejecting a liquid droplet of a dispersion liquid containing settling particles.

DESCRIPTION OF EMBODIMENTS

First Embodiment

A liquid droplet forming device according to a first embodiment of the present invention will be described below with reference to FIGS. 1 to 5. In all the following drawings, dimensions, ratios, and the like of each constituent element have been appropriately changed in order to make the drawings easier to see.

Figure 1:
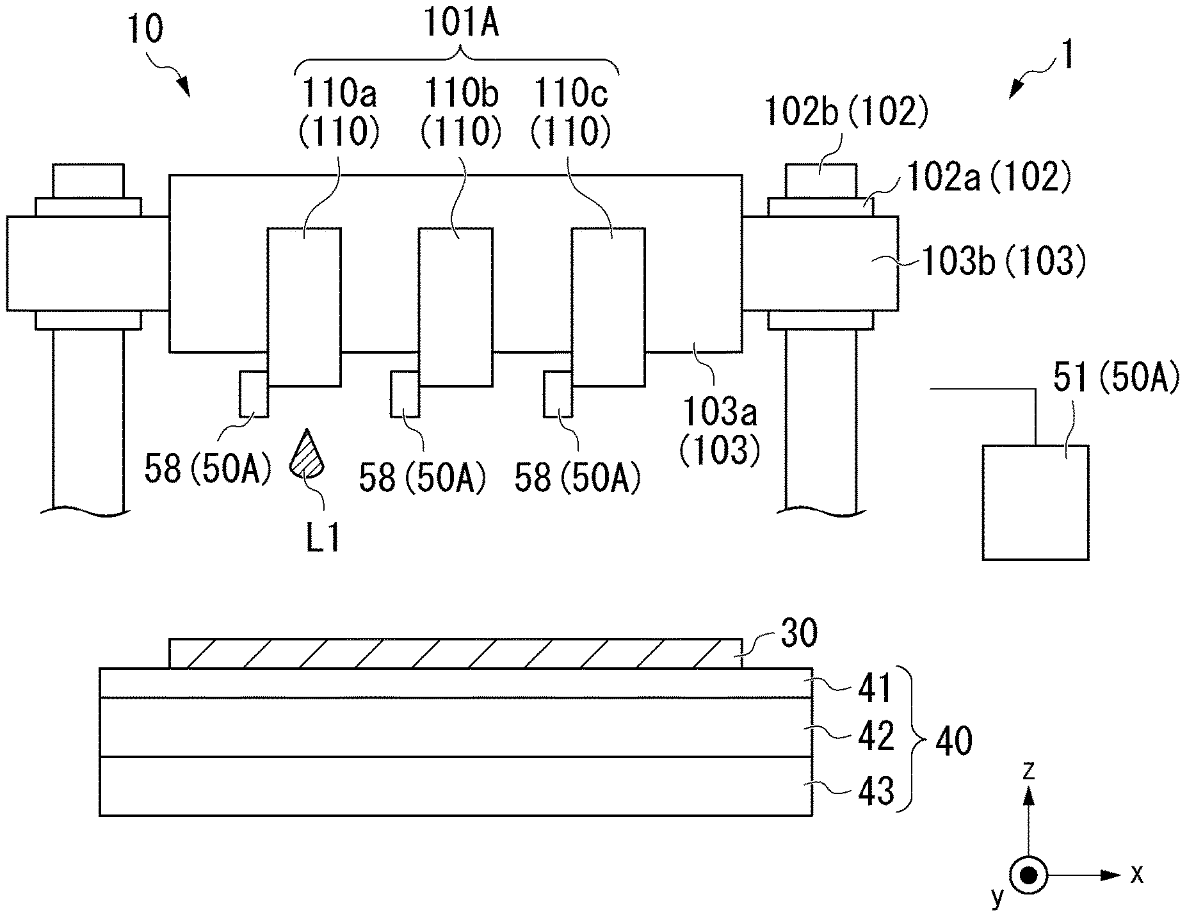
FIG. 1 is a schematic view of a liquid droplet forming device 1 of a first embodiment.

FIG. 1 is a schematic view of a liquid droplet forming device 1 of this embodiment. As shown in FIG. 1, the liquid droplet forming device 1 includes an ejection unit 10, an adhesion portion 30, a mounting unit 40, and a control unit 50A.

In the following description, an xyz orthogonal coordinate system is set, and a positional relationship of each member will be described with reference to this xyz orthogonal coordinate system. Here, a predetermined direction within a horizontal plane is defined as an x-axis direction, a direction orthogonal to the x-axis direction within the horizontal plane is defined as a y-axis direction, and a direction (that is, a vertical direction) orthogonal to each of the x-axis direction and the y-axis direction is defined as a z-axis direction.

In addition, an upward direction in the vertical direction is defined as a +z direction, and a downward direction in the vertical direction is defined as a −z direction. In the following description, the same meanings are applied to the term "up" such as "upward" and "upper surface" and the term "down" such as "downward" and "lower surface".

Further, in the following description, the term "plan view" refers to viewing a target object from above, and the term "planar shape" refers to the shape of the target object as viewed from above.

<<Ejection Unit>>

As shown in FIG. 1, the ejection unit 10 includes an ejection head 110, a first movement unit 102, and a second movement unit 103.

<Ejection Head>

The ejection head 110 ejects a liquid droplet L1 of a liquid containing settling particles. The ejection unit 10 may include only one ejection head 110 or a plurality of ejection heads 110. The ejection unit 10 shown in FIG. 1 includes three ejection heads 110*a*, 110*b*, and 110*c*. The three ejection heads 110*a*, 110*b*, and 110*c* are collectively referred to as an ejection unit 101A.

The ejection heads 110*a*, 110*b*, and 110*c* may have the same configuration or different configurations.

The three ejection heads 110*a*, 110*b*, and 110*c* are arranged in a direction (the x-axis direction in FIG. 1) that intersects with an ejection direction (the −z direction in FIG. 1) of the liquid ejected from the ejection head 110.

Figure 2:
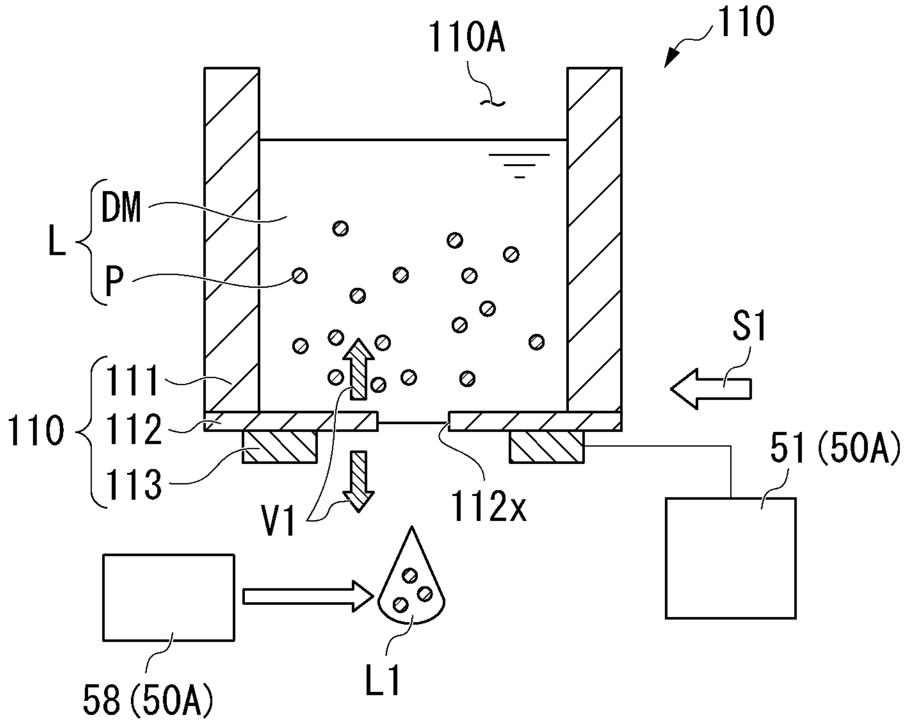
FIG. 2 is a schematic view of an ejection head 110.

FIG. 2 is a schematic view of the ejection head 110. The ejection head 110 includes a liquid holding portion 111, a nozzle plate (film-like member) 112, and vibration applying means 113.

A space surrounded by the liquid holding portion 111, the nozzle plate 112, and the vibration applying means 113 is a liquid chamber 110A of the ejection head 110. The liquid (liquid L) containing settling particles is held in the liquid chamber 110A.

The amount of the liquid L held in the liquid chamber 110A is not particularly limited. Exemplary examples of the amount of the liquid L held in the liquid chamber 110A include about 1 μl to 1 ml. When expensive liquids such as a cell suspension are ejected from the liquid droplet forming device 1, the amount of the liquid L held in the liquid chamber 110A is preferably about 1 μl to 200 μl.

The liquid L ejected by the liquid droplet forming device 1 contains dispersoids (particles P), which are settling particles, and a dispersion medium DM in which the particles P are dispersed.

Exemplary examples of the particles P include organic materials such as polymer particles, and inorganic materials such as fine metal particles and inorganic oxide particles. Exemplary examples of the fine metal particles include silver particles and copper particles. Exemplary examples of the inorganic fine particles include titanium oxide particles and silicon oxide particles.

Further, cells can also be used as the particles P. As the cells, plant cells or animal cells can be applied. Exemplary examples of the animal cells include, particularly, human-derived cells.

Exemplary examples of the dispersion medium DM include water and alcohol. The dispersion medium DM may contain a wetting agent for suppressing evaporation or a surfactant for lowering surface tension.

In this embodiment, the liquid L ejected by the liquid droplet forming device 1 will be described as a dispersion liquid in which cells are dispersed as the particles P in the dispersion medium DM. In this case, as the dispersion medium DM, known buffer solutions such as phosphate buffered saline and Hank's balanced salt solution, or various cell culture media can be used.

The ejection heads 110*a*, 110*b*, and 110*c* may hold the same liquid L or different liquids L.

(Liquid Holding Portion)

The liquid holding portion 111 is a tubular member with both end parts in the z-axis direction open. Exemplary examples of the material of the liquid holding portion 111 include metal, silicon, ceramics, and polymer materials.

The lower end part of the liquid holding portion 111 is blocked by the nozzle plate 112 and the vibration applying means 113. It is preferable that, in a case where cells are used as the particles P, the upper end part of the liquid holding portion 111 is open. When the upper part of the liquid holding portion 111 is open, the liquid L held in the liquid holding portion 111 is less likely to be pressurized during liquid droplet ejection, and damage to cells can be suppressed.

(Nozzle Plate (Film-Like Member))

The nozzle plate 112 is a ring-shaped member having an ejection hole 112*x*. The nozzle plate 112 blocks the lower end part of the liquid holding portion 111 and forms the liquid chamber 110A, which holds the liquid L, together with the liquid holding portion 111. The ejection hole 112*x* communicates with the liquid holding portion 111.

The planar shape, the size when viewed in a plan view, the material, and the structure of the nozzle plate 112 are not particularly limited and can be appropriately selected according to the purpose.

Exemplary examples of the planar shape of the outer edge of the nozzle plate 112 include a circular shape, an elliptical shape, a rectangular shape, a square shape, and a rhombic shape. For example, in a case where the shape of the outer edge of the nozzle plate 112 is a circular shape, the nozzle plate 112 is a circular ring-shaped member.

The nozzle plate 112 is not supported at an end part on an ejection hole 112*x* side and is capable of vibrating up and down. The nozzle plate 112 vibrates at the end part on the ejection hole 112*x* side to apply a downward force to the liquid L in the vicinity of the ejection hole 112*x*, and the liquid L is ejected from the ejection hole 112*x* as the liquid droplet L1.

As the material of the nozzle plate 112, it is preferable to use a material having a certain degree of hardness because the nozzle plate 112 may easily vibrate and it may be difficult to immediately suppress the vibration when the nozzle plate 112 is not in the ejection state, in a case where the nozzle plate 112 is too soft.

Further, in a case where the liquid L to be ejected is a dispersion liquid of cells, the material of the nozzle plate 112 is preferably a material to which cells do not easily adhere. As such a material, a material having high hydrophilicity is preferable.

Exemplary examples of such materials include metal, ceramics, and polymer materials. A fluororesin can be used as the polymer material.

More specifically, exemplary examples of the material of the nozzle plate 112 include stainless steel, nickel, aluminum, silicon dioxide, alumina, and zirconia. Further, it is possible to use a composite material in which a surface of the nozzle plate 112, which is formed with a material different from the above material, is coated with the above-described metal, ceramics, or a synthetic phospholipid polymer (for example, Lipidure, manufactured by NOF Corporation) that mimics the cell membrane.

The opening shape of the ejection hole 112x can be appropriately selected according to the purpose. Exemplary examples of the opening shape of the ejection hole 112x include a circular shape, an elliptical shape, and a quadrilateral shape. Among them, a circular shape is preferable as the opening shape of the ejection hole 112x.

The average opening diameter of the ejection hole 112x is not particularly limited and can be appropriately selected according to the purpose. In order to prevent clogging of the ejection hole 112x by the dispersoids such as cells dispersed in the liquid L in a case where the liquid L to be ejected is a dispersion liquid, it is preferable for the opening shape of the ejection hole 112x to be at least twice the maximum diameter of the dispersoid.

(Vibration Applying Means)

The vibration applying means 113 vibrates the nozzle plate 112 based on an electrical signal to be input, thereby ejecting the liquid droplet L1 from the ejection hole 112x.

The vibration applying means 113 is installed on a lower surface of the nozzle plate 112.

The shape, the size, the material, and the structure of the vibration applying means 113 are not particularly limited and can be appropriately selected according to the purpose.

The shape and the disposition of the vibration applying means 113 are not particularly limited as long as the effects of the invention are not impaired, and can be appropriately designed in accordance with the shape of the nozzle plate 112. For example, in a case where the nozzle plate 112 is a circular ring-shaped planar shape, it is preferable to provide the vibration applying means 113 concentrically around the ejection hole 112x.

A piezoelectric element is suitably used as the vibration applying means 113. As the piezoelectric element, for example, it is possible to employ a structure in which electrodes for applying voltage are provided on an upper surface and a lower surface of a piezoelectric material.

In this case, by applying voltage between the upper and lower electrodes of the piezoelectric element through the control unit 50A, compressive stress is applied in a lateral direction of a film surface so that it is possible to vibrate the nozzle plate 112 in the up and down direction of the film surface.

The piezoelectric material is not particularly limited and can be appropriately selected according to the purpose, and exemplary examples thereof include lead zirconate titanate (PZT), bismuth iron oxide, metal niobate, barium titanate, and composites of these materials with metals or different oxides. Among them, lead zirconate titanate (PZT) is preferable.

<First Movement Unit>

The first movement unit 102 includes a support member 102a and a linear motion unit 102b. The first movement unit 102 is a pair of members provided at an end part on the +x side and an end part on the −x side of the second movement unit 103.

The support member 102a is a rectangular member in the field of view when viewed from the +y direction and supports the second movement unit 103.

The linear motion unit 102b is an elongated member extending in the z-axis direction. The linear motion unit 102b moves the support member 102a up and down in the z-axis direction. The linear motion unit 102b can employ, for example, a known linear actuator including a stepping motor as a drive source.

The first movement unit 102 moves the support member 102a in the z-axis direction, thereby moving the ejection unit 101A supported by the second movement unit 103 in the z-axis direction.

<Second Movement Unit>

The second movement unit 103 includes a support member 103a and a linear motion unit 103b.

The support member 103a is a rectangular member in the field of view when viewed from the +y direction and supports the ejection unit 101A.

The linear motion unit 103b is an elongated member extending in the x-axis direction. The linear motion unit 103b moves the support member 103a horizontally in the x-axis direction. Both ends of the linear motion unit 103b are each supported by the support member 102a of the first movement unit 102.

The linear motion unit 103b can employ, for example, a known linear actuator including a stepping motor as a drive source.

The second movement unit 103 moves the support member 103a in the x-axis direction, thereby moving the ejection unit 101A supported by the support member 103a in the x-axis direction.

<<Adhesion Portion>>

The adhesion portion 30 is disposed in the ejection direction of the liquid droplet L1 ejected from the ejection unit 10, and the liquid droplet L1 adheres thereto. As the adhesion portion 30, it is possible to select a structure object having various materials and shapes according to the purpose of ejecting the liquid.

<<Mounting Unit>>

The adhesion portion 30 is mounted on the mounting unit 40. The mounting unit 40 includes an x-stage 41, a y-stage 42, and a base 43.

The x-stage 41 supports and fixes the adhesion portion 30. Further, the x-stage 41 moves the adhesion portion 30 horizontally in the x-axis direction.

The y-stage 42 moves the x-stage 41 horizontally in the y-axis direction.

The base 43 supports the y-stage 42.

The mounting unit 40 can employ a known configuration as the x and y stages.

<<Control Unit>>

The control unit 50A generates an electrical signal for operating each unit of the liquid droplet forming device 1, and supplies and controls each unit. For example, the control unit 50A generates drive signals to be supplied to the ejection unit 10 and the mounting unit 40, and supplies each unit to control the behavior of each unit.

More specifically, the control unit 50A selectively supplies any one of the following three types of electrical signals to the vibration applying means 113 of the ejection head 11. As a result, the ejection head 11 operates as follows:

(i) an ejection signal S1 for forming the liquid droplet L1 by vibrating the nozzle plate 112;

(ii) a stirring signal S2 for vibrating the nozzle plate 112 in a range in which the liquid droplet L1 is not formed; and (iii) a micro-vibration signal S3 for vibrating the nozzle plate 112 weaker than the vibration generated by the stirring signal S2.

First, as shown in FIG. 2, when the electrical signal is supplied from the control unit 50A to the vibration applying means 113, the vibration applying means 113 vibrates to vibrate the nozzle plate 112. At this time, when the ejection signal S1 is supplied to the vibration applying means 113, a vibration V1 occurs in the vicinity of the ejection hole 112x of the nozzle plate 112. Due to the vibration V1, the liquid L stored in the liquid chamber 110A is ejected as the liquid droplet L1.

Figure 3:
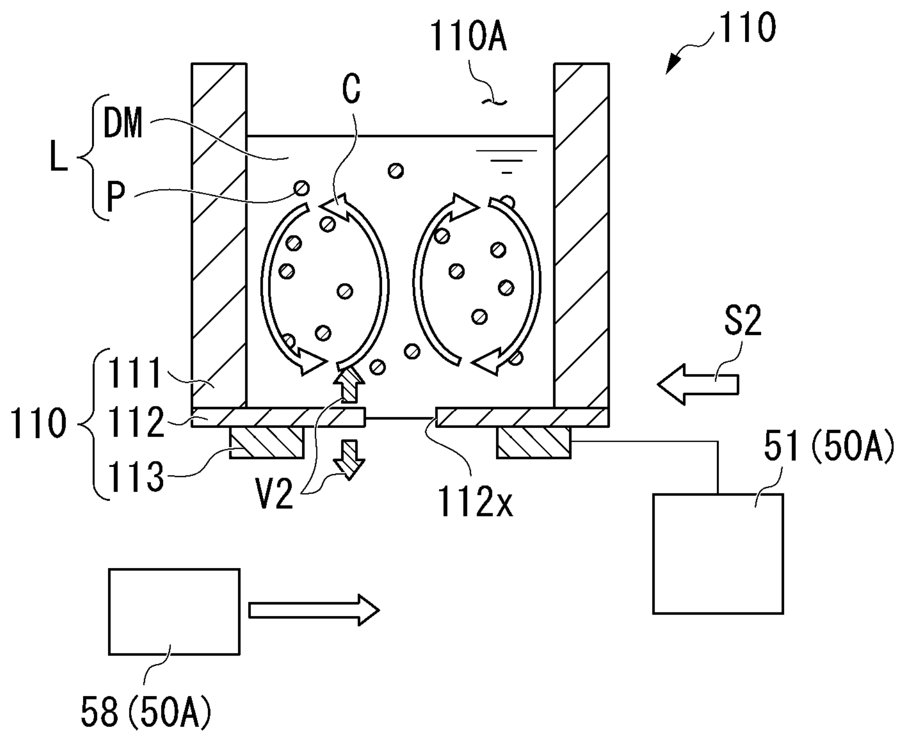
FIG. 3 is a schematic view of the ejection head 110.

Next, as shown in FIG. 3, when the stirring signal S2 is supplied from the control unit 50A to the vibration applying means 113, a vibration V2 having an amplitude smaller than the vibration V1 occurs in the vicinity of the ejection hole 112*x* of the nozzle plate 112. Due to the vibration V2, convection C occurs in the liquid L stored in the liquid chamber 110A. As a result, the liquid L is stirred, and the particles P are uniformly dispersed in the liquid L.

Such a stirring signal S2 can be generated, for example, by reducing the drive voltage of the signal waveform as compared with the ejection signal S1. In addition, the stirring signal S2 may be generated by controlling at least one selected from the group consisting of the drive voltage of the electrical signal, the frequency of the signal waveform, and the application interval of the electrical signal, as long as the nozzle plate 112 can be vibrated in a range in which the liquid droplet L1 is not formed.

Figure 4:
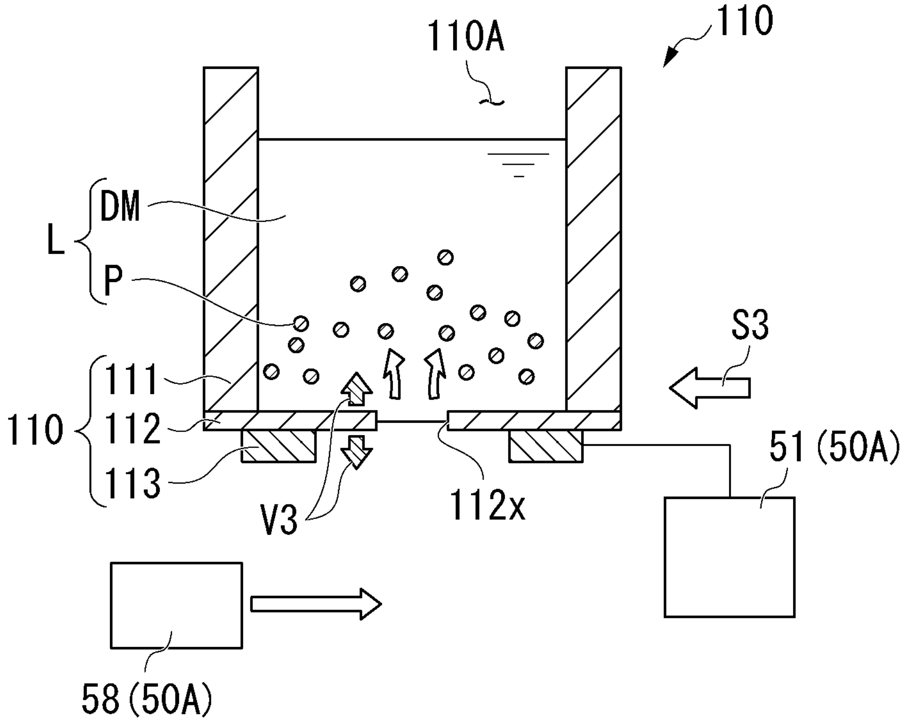
FIG. 4 is a schematic view of the ejection head 110.

Further, as shown in FIG. 4, when the micro-vibration signal S3 is supplied from the control unit 50A to the vibration applying means 113, a vibration V3 having an amplitude smaller than the vibration V2 occurs in the vicinity of the ejection hole 112*x* of the nozzle plate 112. Due to the vibration V3, the liquid L in the vicinity of the ejection hole 112*x* vibrates, and the particles P are entrained and lifted. As a result, the particles P are less likely to be accumulated at a bottom (an upper surface of the nozzle plate 112) of the liquid chamber 110A.

That is, the micro-vibration signal S3 causes the nozzle plate 112 to vibrate weaker than the vibration generated by the stirring signal S2. Further, the micro-vibration signal S3 causes the nozzle plate 112 to vibrate in a range in which the liquid droplet L1 is not formed even in a case where the amount of the liquid L stored in the liquid chamber 110A is the minimum amount in use.

Such a micro-vibration signal S3 can be generated, for example, by reducing the drive voltage of the signal waveform as compared with the stirring signal S2. In addition, the micro-vibration signal S3 may be generated by controlling at least one selected from the group consisting of the drive voltage of the electrical signal, the frequency of the signal waveform, and the application interval of the electrical signal, as long as the nozzle plate 112 can be vibrated weaker than the vibration V2.

The vibration V3 caused by the micro-vibration signal S3 does not require as much intensity as the vibration V2 for uniformly stirring the liquid L and only needs to vibrate the liquid L in the vicinity of the ejection hole 112*x*. Therefore, the vibration V3 can apply the intended vibration to the liquid L even when the amount of the liquid L stored in the liquid chamber 110A is changed, and can entrain and lift the particles P in the vicinity of the ejection hole 112*x*.

Further, the vibration V3 caused by the micro-vibration signal S3 does not erroneously form the liquid droplet L1 even when the liquid L stored in the liquid chamber 110A decreases. As a result, ejection failure can be suppressed, and the liquid droplets containing the settling particles P can be stably ejected.

It is preferable that the control unit 50A supplies each electrical signal as follows when the liquid droplets L1 are intermittently ejected from the ejection head 11.

First, it is preferable that the control unit 50A intermittently continuously supplies the micro-vibration signal S3 during the standby time from the ejection of the liquid droplet L1 to the next ejection of the liquid droplet L1. As a result, in the ejection head 11, the particles P are less likely to be accumulated at the bottom of the liquid chamber 110A even during the standby time, and ejection failure is less likely to occur.

Further, it is preferable that the control unit 50A supplies the stirring signal S2 to the vibration applying means 113 to stir the liquid L inside the liquid chamber 110A before the ejection failure occurs. As a result, in the ejection head 11, even in a case where the particles P are accumulated at the bottom of the liquid chamber 110A, it is possible to suitably eject the liquid L by dispersing the particles P within the liquid L again.

For example, the control unit 50A may supply the stirring signal S2 to the vibration applying means 113 based on the lapse of a time set in advance to stir the liquid L held in the liquid holding portion. It is preferable that the time for supplying the stirring signal S2 is set according to a time obtained by calculating the time it takes for the particles P to be accumulated according to the type of the liquid L being used. By supplying the stirring signal S2 at the time obtained as described above through the control unit 50A, the ejection head 11 can suitably eject the liquid L by stirring the liquid L before a risk of the accumulation of the particles P and the occurrence of the ejection failure increases.

Alternatively, the control unit 50A may supply the stirring signal S2 to stir the liquid L in a case where it is detected that the ejection failure has actually occurred. In order to perform such detection, the control unit 50A may include detection means 58 for detecting the ejection state of the liquid droplet L1 to be ejected.

The detection means 58 is provided in the vicinity of the ejection hole 112*x* of the ejection head 11 and detects the liquid droplet L1 to be ejected from the ejection hole 112*x*. As the detection means 58, an imaging device that images the liquid droplet L1 or an optical sensor that detects the flying liquid droplet L1 can be employed. As the imaging device and the optical sensor, known configurations can be employed.

Figure 5:
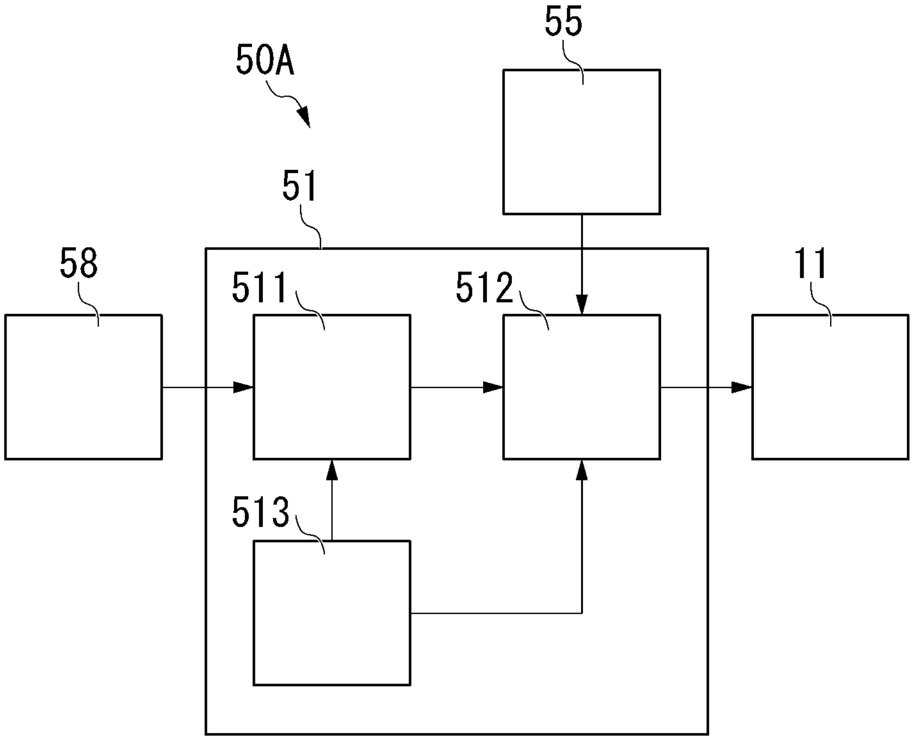
FIG. 5 is an explanatory block diagram of a control unit 50A.

FIG. 5 is an explanatory block diagram of the control unit 50A. As shown in FIG. 5, the control unit 50A includes a control device 51 including a detection section 511 and an instruction section 512. Further, the control unit 50A may include an input unit (input means) 55 and the detection means 58.

A known information processing terminal can be used as the control device 51.

The input unit 55 is an interface for inputting drive conditions of the ejection head 11 into the control device 51. Exemplary examples of the input unit 55 include a keyboard and a mouse.

In the control unit 50A, the detection section 511 detects the presence or absence of ejection failure, specifically, the presence or absence of the ejection of the liquid droplet L1 corresponding to the ejection signal S1 supplied to the ejection head 11, based on the detection result of the detection means 58.

In a case where the detection section 511 determines that ejection failure has occurred, the instruction section 512 supplies the stirring signal S2 to the ejection head 11 (vibration applying means 113). As a result, the control unit 50A can stir the liquid L held in the liquid holding portion by supplying the stirring signal S2 to the vibration applying means 113 based on the detection result in a case where it is detected that the ejection failure has actually occurred.

In addition, the instruction section 512 may supply the stirring signal S2 to the ejection head 11 based on an instruction input through the input unit 55.

Further, the control unit 50A (control device 51) may include a storage section 513. The storage section 513 stores a correspondence relationship between the type of the liquid L to be ejected and the drive condition and a detailed drive condition for the instruction input through the input unit 55.

The types of the liquid L are classified by the types of the particle P contained in the liquid L and of the dispersion medium. In the liquid droplet forming device 1, it is preferable that appropriate drive conditions for the various liquids L are determined in advance through preliminary experiments and that the determined drive conditions are stored in the storage section 513.

The storage section 513 may store the correspondence relationship between the type of the liquid L and the drive condition in the form of a relational expression or a reference table. Alternatively, for the "instruction input from the input unit 55", a plurality of conditions may be consolidated in advance and then a general term such as a "mode 1" or a "mode 2" may be used.

Such a control unit 50A can receive the input of the type of the liquid L using the input unit 55, thereby retrieving the drive condition corresponding to the type of the liquid L from the storage section 513 and instructing the instruction section 512 to supply the appropriate electrical signal to the ejection head 11.

It is preferable that, in the control unit 50A, at least one selected from the group consisting of the drive voltage of the electrical signal to be supplied to the vibration applying means 113, the frequency of the signal waveform, and the application interval of the electrical signal can be input using the input unit 55 as the drive condition. As a result, for example, when ejecting the type of the liquid L that is not stored in the storage section 513, an appropriate drive condition can be freely input.

The liquid L held in the liquid chamber 110A enters a state in which the particles P are suitably dispersed, through these operations. Further, in the liquid L, the settling of the particles P and the accumulation of the particles P at the bottom of the liquid chamber 110A are suppressed. Therefore, with the liquid droplet forming device 1 having such a configuration as described above, it is possible to stably eject the dispersion liquid.

Second Embodiment

Figure 6:
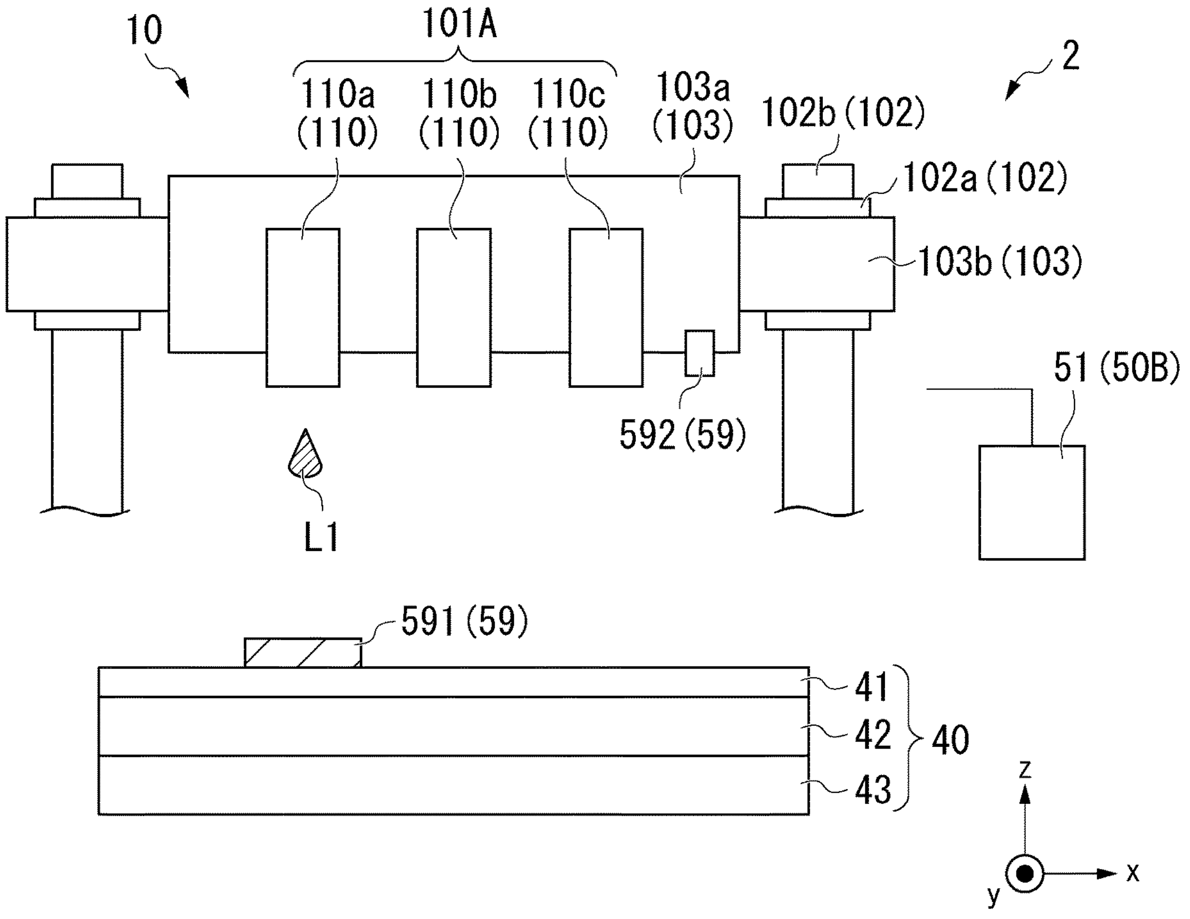
FIG. 6 is a schematic view of a liquid droplet forming device 2 of a second embodiment.
Figure 7:
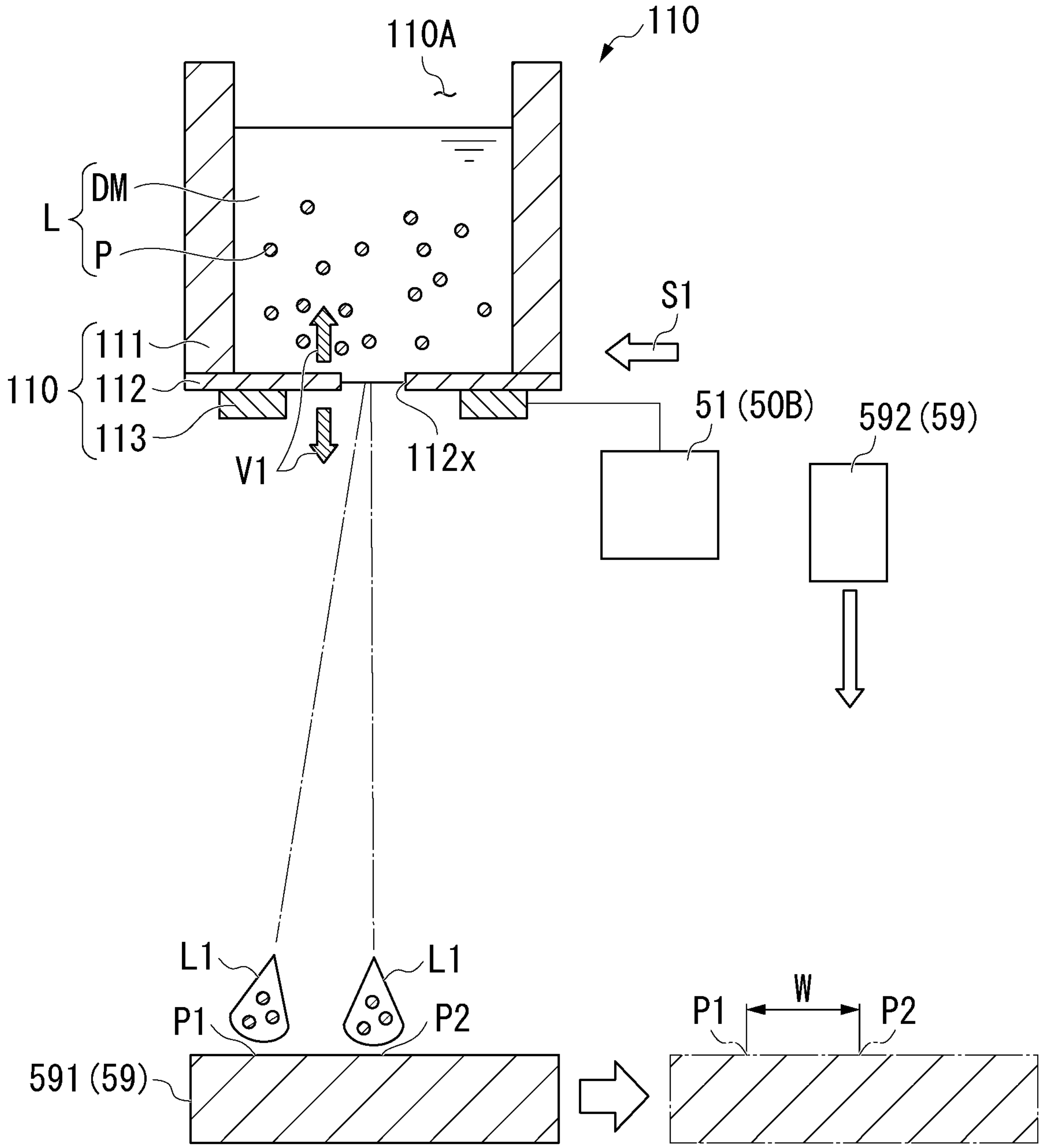
FIG. 7 is a schematic view showing a peripheral structure of the ejection head 110.

FIGS. 6 and 7 are explanatory views of a liquid droplet forming device 2 according to a second embodiment of the present invention. The liquid droplet forming device 2 of this embodiment has some common configurations with those of the liquid droplet forming device 1 of the first embodiment. Therefore, in this embodiment, the same reference numerals are assigned to the common constituent elements to the first embodiment, and detailed description thereof will not be repeated.

FIG. 6 is a schematic view of the liquid droplet forming device 2 of this embodiment and is a view corresponding to FIG. 1. FIG. 7 is a schematic view showing the peripheral structure of the ejection head 11 and is a view corresponding to FIG. 2.

As shown in FIGS. 6 and 7, the liquid droplet forming device 2 includes the ejection unit 10, the mounting unit 40, and a control unit 50B. The control unit 50B includes detection means 59 instead of the detection means 58 provided in the control unit 50A described above.

The detection means 59 includes a target portion 591 and imaging means 592.

The target portion 591 is configured to change a relative position with respect to the ejection hole 112*x* by being mounted on, for example, the mounting unit 40 to face the ejection hole 112*x* of the ejection head 11. The target portion 591 is used for trial shots of the liquid droplet L1 from the ejection head 11. It is preferable that the target portion 591 is marked with a reference mark (reference point) at a position where the liquid droplet L1 ejected in an ideal ejection state from the ejection hole 112*x* lands.

The imaging means 592 images the liquid droplet L1 that has landed onto the target portion 591. The imaging means 592 is provided on the support member 103*a* in an orientation that allows imaging of the lower side. In FIG. 6, one imaging means 592 is provided for the plurality of ejection heads 11, but for example, imaging means may be provided for each of the plurality of ejection heads 11. In that case, it is preferable that the imaging means 592 is provided in the vicinity of the ejection hole 112*x* of the ejection head 11.

As the imaging means 592, a known imaging device such as a CCD camera or a CMOS camera can be used.

As shown in FIG. 7, in the liquid droplet forming device 2, when confirming the ejection state of the ejection head 11, first, the liquid droplet L1 is ejected to the target portion 591 facing the ejection head 11. Next, the target portion 591 is moved to a position facing the imaging means 592, and the landing position of the liquid droplet L1 on the target portion 591 is imaged.

In the control unit 50B, the detection section 511 detects the ejection state by detecting a deviation amount W between a position P1 of the liquid droplet L1 that has landed onto the target portion 591 and an assumed landing position P2 of the liquid droplet L1 assumed based on the relative position between the ejection hole 112*x* and the target portion 591 based on the position P1 and the assumed landing position P2. In a case where the liquid droplet L1 ejected in an ideal ejection state from the ejection hole 112*x* is ejected, it is considered that the assumed landing position P2 coincides with the reference point of the target portion 591 and that the position P1 overlaps the reference point.

The detection section 511 determines that there is no ejection failure, in a case where the actual landing position P1 and the assumed landing position P2 coincide with each other or the deviation amount W falls within a predetermined reference range. On the other hand, the detection section 511 determines that ejection failure has occurred, in a case where the detected deviation amount W deviates from the reference range.

It is preferable that the storage section 513 stores the reference range of the deviation amount W. The reference range of the deviation amount W varies depending on the configuration of the ejection head of the device being used, the type of the liquid L, and the like. Therefore, it is preferable that the reference range of the deviation amount W is appropriately set by performing preliminary experiments.

In a case where the detection section 511 determines that ejection failure has occurred, the instruction section 512 supplies the stirring signal S2 to the ejection head 11 (vibration applying means 113). As a result, the control unit 50B can stir the liquid L held in the liquid holding portion by supplying the stirring signal S2 to the vibration applying means 113 based on the detection result in a case where it is detected that the ejection failure has actually occurred.

Even with the liquid droplet forming device 2 having such a configuration as described above, it is possible to stably eject the dispersion liquid.

Third Embodiment

Figure 8:
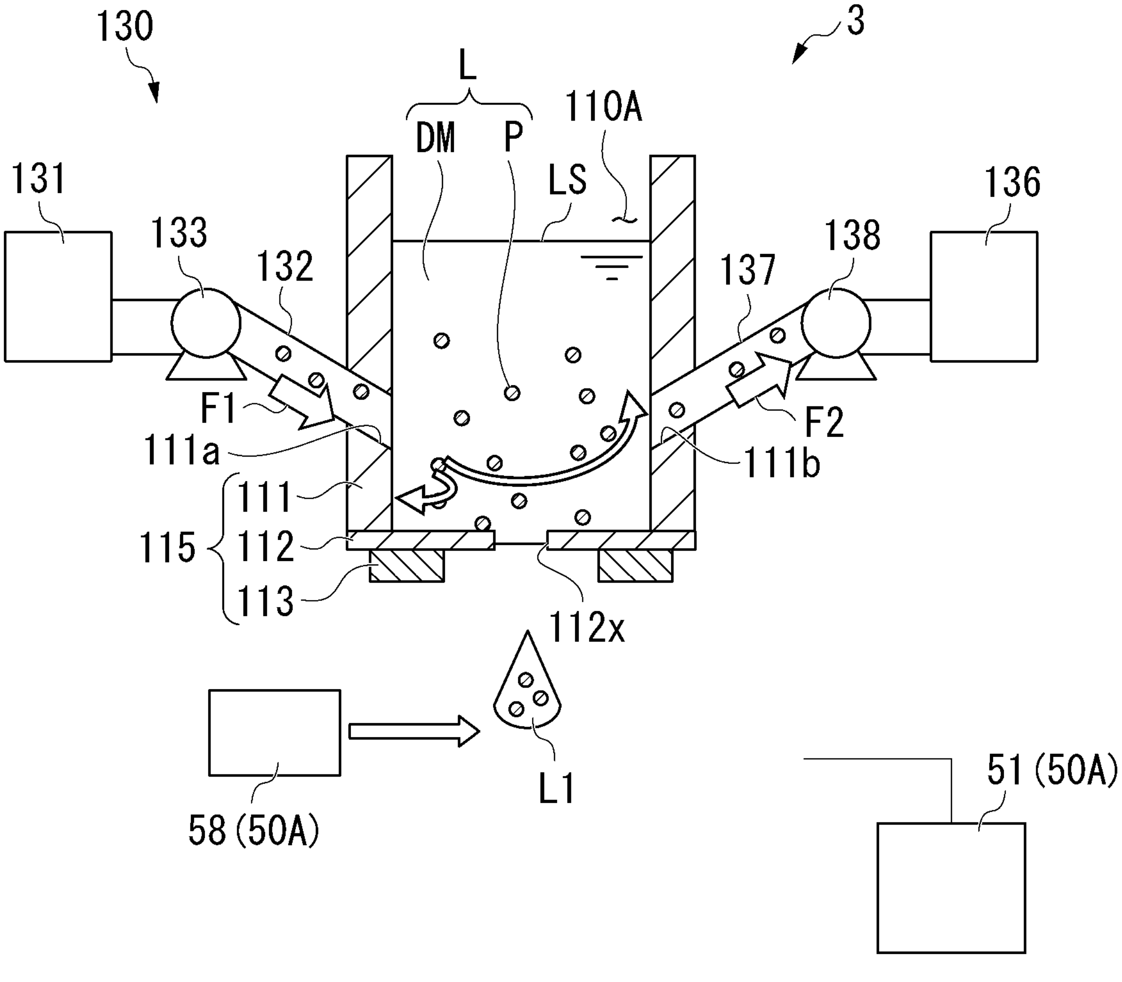
FIG. 8 is an explanatory view of a liquid droplet forming device 3 of a third embodiment.

FIG. 8 is an explanatory view of a liquid droplet forming device 3 of a third embodiment and is an explanatory view an ejection head provided in the liquid droplet forming device 3.

An ejection head 115 includes the liquid holding portion 111, the nozzle plate 112, the vibration applying means 113, and stirring means 130.

<Stirring Means>

The stirring means 130 supplies the liquid L to the liquid chamber 110A and removes the liquid L from the liquid chamber 110A. The stirring means 130 includes a first storage portion 131, a first flow path 132, a first pump 133, a second storage portion 136, a second flow path 137, and a second pump 138.

The first storage portion 131 and the second storage portion 136 each store the liquid L.

One end of the first flow path 132 is connected to the first storage portion 131, and the other end is connected to a through-hole 111*a* provided in the liquid holding portion 111. As a result, the first flow path 132 connects the first storage portion 131 and the liquid chamber 110A to each other. The through-hole 111*a* is located below a liquid surface LS of the liquid L inside the liquid chamber 110A.

One end of the second flow path 137 is connected to the second storage portion 136, and the other end is connected to a through-hole 111*b* provided in the liquid holding portion 111. As a result, the second flow path 137 connects the second storage portion 136 and the liquid chamber 110A to each other. The through-hole 111*b* is located below the liquid surface LS of the liquid L inside the liquid chamber 110A.

The first flow path 132 and the second flow path 137 are tubes made of a soft resin material as a forming material. Exemplary examples of the soft resin material include polyurethane, silicone rubber, and a fluororesin.

The first pump 133 is provided within the pathway of the first flow path 132. The first pump 133 supplies the liquid L from the first storage portion 131 to the liquid chamber 110A or removes the liquid L from the liquid chamber 110A, through the first flow path 132.

The second pump 138 is provided within the pathway of the second flow path 137. The second pump 138 supplies the liquid L from the second storage portion 136 to the liquid chamber 110A or removes the liquid L from the liquid chamber 110A, through the second flow path 137.

The first pump 133 and the second pump 138 are pumps capable of suctioning, holding, and discharging a fixed amount of liquid. As the first pump 133 and the second pump 138, for example, a syringe pump or a diaphragm pump can be used.

<<Control Unit>>

The control unit 50A generates an electrical signal for operating each unit of the liquid droplet forming device 3, and supplies and controls each unit. In addition to each of the above-described signals, the control unit 50A generates and supplies a control signal for controlling the behavior of the stirring means 130.

In this embodiment, the control unit 50A selectively supplies any one of the following two types of electrical signals to the vibration applying means 113 of the ejection head 11:

(i) the ejection signal S1 for forming the liquid droplet L1 by vibrating the nozzle plate 112; and (ii) the micro-vibration signal S3 for vibrating the nozzle plate 112 in a range in which the liquid droplet L1 is not formed.

When the micro-vibration signal S3 is supplied to the vibration applying means 113, the vibration V3 having an amplitude at which the liquid droplet L1 is not formed occurs in the vicinity of the ejection hole 112*x* of the nozzle plate 112. Due to the vibration V3, the liquid L in the vicinity of the ejection hole 112*x* vibrates, and the particles P are entrained and lifted. As a result, the particles P are less likely to be accumulated at the bottom (the upper surface of the nozzle plate 112) of the liquid chamber 110A.

In the control unit 50A, the detection section 511 (see FIG. 5) detects the presence or absence of ejection failure, specifically, the presence or absence of the ejection of the liquid droplet L1 corresponding to the ejection signal S1 supplied to the ejection head 11, based on the detection result of the detection means 58.

In a case where the detection section 511 determines that ejection failure has occurred, the instruction section 512 (see FIG. 5) supplies the control signal for controlling the behavior of the stirring means 130 to the stirring means 130. As a result, the control unit 50A can stir the liquid L held in the liquid holding portion by operating the stirring means 130 based on the detection result in a case where it is detected that the ejection failure has actually occurred.

Even with the liquid droplet forming device 3 having such a configuration as described above, it is possible to stably eject the dispersion liquid.

In this embodiment, the control unit 50A including the detection means 58 is used, but the control unit 50B shown in the second embodiment may also be used.

As described above, although the preferred examples of the embodiments according to the present invention have been described with reference to the accompanying drawings, the present invention is not limited to such examples. All the shapes, combinations, and the like of each constituent member described in the above-described examples are examples, and various changes can be made based on design requirements and the like without departing from the gist of the present invention.

In order to achieve the above object, an aspect of the present invention includes the following aspects.

[1] A liquid droplet forming device including: an ejection head that ejects a liquid droplet of a liquid containing settling particles; and a control unit that controls a behavior of the ejection head by supplying an electrical signal, in which the ejection head includes a liquid holding portion that holds the liquid, a film-like member that has an ejection hole for ejecting the liquid droplet and that forms a liquid chamber, which holds the liquid, together with the liquid holding portion, and vibration applying means for vibrating the film-like member based on the electrical signal, the electrical signal includes an ejection signal for forming the liquid droplet by vibrating the film-like member, a stirring signal for vibrating the film-like member in a range in which the liquid droplet is not formed, the stirring signal having a drive voltage of a signal waveform lower than a drive voltage of the ejection signal, and a micro-vibration signal having a drive voltage lower than the drive voltage of the stirring signal, and the control unit selectively supplies any one of the ejection signal, the stirring signal, and the micro-vibration signal to the vibration applying means.

[2] A liquid droplet forming device including: an ejection head that ejects a liquid droplet of a liquid containing settling particles; and a control unit that controls a behavior of the ejection head by supplying an electrical signal, in which the ejection head includes a liquid holding portion that holds the liquid, a film-like member that has an ejection hole for ejecting the liquid droplet and that forms a liquid chamber, which holds the liquid, together with the liquid holding portion, vibration applying means for vibrating the film-like member based on the electrical signal, and stirring means for stirring the liquid held in the liquid holding portion, the electrical signal includes an ejection signal for forming the liquid droplet by vibrating the film-like member, a micro-vibration signal for vibrating the film-like member in a range in which the liquid droplet is not formed, the micro-vibration signal having a drive voltage of a signal waveform lower than a drive voltage of the ejection signal, and a control signal for controlling a behavior of the stirring means, and the control unit selectively supplies any one of the ejection signal and the micro-vibration signal to the vibration applying means and applies the control signal to the stirring means.

[3] The liquid droplet forming device according to [1] or [2], in which the control unit includes detection means for detecting an ejection state of the liquid droplet to be ejected, and the liquid held in the liquid holding portion is stirred based on the ejection state.

[4] The liquid droplet forming device according to [3], in which the control unit detects, as the ejection state, absence of ejection of the liquid droplet corresponding to the ejection signal, and the liquid held in the liquid holding portion is stirred based on a detection result.

[5] The liquid droplet forming device according to [3] or [4], in which the detection means includes a target portion that faces the ejection hole and whose relative position with respect to the ejection hole is changeable, and imaging means for imaging the liquid droplet that has landed onto the target portion, the control unit detects the ejection state based on a position of the liquid droplet that has landed onto the target portion, and an assumed landing position of the liquid droplet assumed based on the relative position between the ejection hole and the target portion, and the liquid held in the liquid holding portion is stirred based on a detection result.

[6] The liquid droplet forming device according to any one of [1] to [5], in which the control unit stirs the liquid held in the liquid holding portion based on a lapse of a time set in advance.

[7] The liquid droplet forming device according to any one of [1] to [6], in which the control unit includes input means for inputting a drive condition of the ejection head.

[8] The liquid droplet forming device according to [7], in which, as the drive condition, at least one selected from the group consisting of a drive voltage of the electrical signal, a frequency of the signal waveform, and an application interval of the electrical signal is configured to be input.

[9] The liquid droplet forming device according to [7] or [8], in which the control unit includes a storage section that stores a plurality of correspondence relationships between a type of the liquid and the drive condition, and the input means is used to input a type of the liquid droplet.

REFERENCE SIGNS LIST

1, 2, 3: liquid droplet forming device
110, 110*a*, 110*b*, 110*c*, 115: ejection head
50A, 50B: control unit
55: input unit (input means)
58, 59: detection means
110A: liquid chamber
111: liquid holding portion
112: nozzle plate (film-like member)
112*x*: ejection hole
113: vibration applying means
130: stirring means
513: storage section
591: target portion
592: imaging means
L: liquid
L1: liquid droplet
P: particle
P1: position
P2: assumed landing position
S1: ejection signal
S2: stirring signal
S3: micro-vibration signal
V1, V2, V3: vibration

PATENT DOCUMENT

[Patent Document 1] Japanese Patent No. 6627394

What is claimed is:

1. A liquid droplet forming device comprising:
an ejection head that ejects a liquid droplet of a liquid containing settling particles; and
a control unit that controls a behavior of the ejection head by supplying an electrical signal,
wherein the ejection head includes
a liquid holding portion that holds the liquid,
a film-like member that has an ejection hole for ejecting the liquid droplet and that forms a liquid chamber, which holds the liquid, together with the liquid holding portion, and
vibration applying means for vibrating the film-like member based on the electrical signal,
the electrical signal includes
an ejection signal for forming the liquid droplet by vibrating the film-like member,
a stirring signal for vibrating the film-like member in a range in which the liquid droplet is not formed, the stirring signal having a drive voltage of a signal waveform lower than a drive voltage of the ejection signal, and
a micro-vibration signal having a drive voltage lower than the drive voltage of the stirring signal,
the control unit is configured to selectively supply any one of the ejection signal, the stirring signal, and the micro-vibration signal to the vibration applying means, and
the control unit is configured to continuously supply the micro-vibration signal during a standby time from the ejection of the liquid droplet to the next ejection of the liquid droplet.

2. The liquid droplet forming device according to claim 1, wherein
the control unit includes detection means for detecting an ejection state of the liquid droplet to be ejected, and
the liquid held in the liquid holding portion is stirred based on the ejection state.

3. The liquid droplet forming device according to claim 2, wherein the control unit is configured to detect, as the ejection state, absence of ejection of the liquid droplet corresponding to the ejection signal, and the liquid held in the liquid holding portion is stirred based on a detection result.

4. The liquid droplet forming device according to claim 3, wherein the control unit is configured to supply the stirring signal to the vibration applying means in response to the detection means detecting the absence of ejection of the liquid droplet corresponding to the ejection signal.

5. The liquid droplet forming device according to claim 2, wherein the detection means includes a target portion that faces the ejection hole and whose relative position with respect to the ejection hole is changeable, and imaging means for imaging the liquid droplet that has landed onto the target portion, the control unit is configured to detect the ejection state based on a position of the liquid droplet that has landed onto the target portion and an assumed landing position of the liquid droplet assumed based on the relative position between the ejection hole and the target portion, and the liquid held in the liquid holding portion is stirred based on a detection result.

6. The liquid droplet forming device according to claim 1, wherein the control unit is configured to supply the stirring signal to the vibration applying means based on a lapse of a time set in advance.

7. The liquid droplet forming device according to claim 1, wherein the control unit includes input means for inputting a drive condition of the ejection head.

8. The liquid droplet forming device according to claim 7, wherein, as the drive condition, at least one selected from the group consisting of a drive voltage of the electrical signal, a frequency of the signal waveform, and an application interval of the electrical signal is configured to be input.

9. The liquid droplet forming device according to claim 7, wherein the control unit includes a storage section that stores a plurality of correspondence relationships between a type of the liquid and the drive condition, and the input means is used to input the type of the liquid.

10. The liquid droplet forming device according to claim 9, wherein the control unit is configured to calculate a settling time for the settling particles based on the type of the liquid, and supply the stirring signal based on a lapse of the calculated settling time.

11. The liquid droplet forming device according to claim 9, wherein the control unit is configured to configure the electrical signal based on the type of the liquid input via the input means.

12. A liquid droplet forming device comprising:

an ejection head that ejects a liquid droplet of a liquid containing settling particles; and a control unit that controls a behavior of the ejection head by supplying an electrical signal, wherein the ejection head includes a liquid holding portion that holds the liquid, a film-like member that has an ejection hole for ejecting the liquid droplet and that forms a liquid chamber, which holds the liquid, together with the liquid holding portion, vibration applying means for vibrating the film-like member based on the electrical signal, and stirring means for stirring the liquid held in the liquid holding portion, the electrical signal includes an ejection signal for forming the liquid droplet by vibrating the film-like member, a micro-vibration signal for vibrating the film-like member in a range in which the liquid droplet is not formed, the micro-vibration signal having a drive voltage of a signal waveform lower than a drive voltage of the ejection signal, and a control signal for controlling a behavior of the stirring means, the control unit is configured to selectively supply any one of the ejection signal and the micro-vibration signal to the vibration applying means and applies the control signal to the stirring means, and the control unit is configured to continuously supply the micro-vibration signal during a standby time from the ejection of the liquid droplet to the next ejection of the liquid droplet.

13. The liquid droplet forming device according to claim 12, wherein the control unit includes detection means for detecting an ejection state of the liquid droplet to be ejected, and the liquid held in the liquid holding portion is stirred based on the ejection state.

14. The liquid droplet forming device according to claim 13, wherein the control unit is configured to detect, as the ejection state, absence of ejection of the liquid droplet corresponding to the ejection signal, and the liquid held in the liquid holding portion is stirred based on a detection result.

15. The liquid droplet forming device according to claim 13, wherein the detection means includes a target portion that faces the ejection hole and whose relative position with respect to the ejection hole is changeable, and imaging means for imaging the liquid droplet that has landed onto the target portion, the control unit is configured to detect the ejection state based on a position of the liquid droplet that has landed onto the target portion and an assumed landing position of the liquid droplet assumed based on the relative position between the ejection hole and the target portion, and the liquid held in the liquid holding portion is stirred based on a detection result.

16. The liquid droplet forming device according to claim 12, wherein the control unit is configured to supply the control signal to the stirring means based on a lapse of a time set in advance.

17. The liquid droplet forming device according to claim 12, wherein the control unit includes input means for inputting a drive condition of the ejection head.

18. The liquid droplet forming device according to claim 17, wherein, as the drive condition, at least one selected from the group consisting of a drive voltage of the electrical signal, a frequency of the signal waveform, and an application interval of the electrical signal is configured to be input.

19. The liquid droplet forming device according to claim 17, wherein the control unit includes a storage section that stores a plurality of correspondence relationships between a type of the liquid and the drive condition, and the input means is used to input the type of the liquid.

* * * * *